(12) United States Patent
Anakkot

(10) Patent No.: US 11,113,118 B2
(45) Date of Patent: Sep. 7, 2021

(54) SYSTEM AND METHOD FOR MANAGING NETWORK ACCESS CONTROL PRIVILEGES BASED ON COMMUNICATION CONTEXT AWARENESS

(71) Applicant: HEWLETT PACKARD ENTERPRISE DEVELOPMENT LP, Houston, TX (US)

(72) Inventor: Anees Anakkot, Trichur (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 248 days.

(21) Appl. No.: 16/041,524

(22) Filed: Jul. 20, 2018

(65) Prior Publication Data
US 2020/0026573 A1    Jan. 23, 2020

(51) Int. Cl.
| | |
|---|---|
| G06F 9/50 | (2006.01) |
| H04L 29/06 | (2006.01) |
| H04L 12/24 | (2006.01) |
| H04L 29/08 | (2006.01) |
| H04L 12/18 | (2006.01) |

(52) U.S. Cl.
CPC ........ G06F 9/5072 (2013.01); H04L 41/0803 (2013.01); H04L 63/102 (2013.01); H04L 65/1003 (2013.01); H04L 65/80 (2013.01); H04L 67/14 (2013.01); H04L 67/322 (2013.01)

(58) Field of Classification Search
CPC ... G06F 9/5072; H04L 65/1003; H04L 65/80; H04L 67/14; H04L 67/322; H04L 67/22; H04L 63/102; H04L 41/0803; H04L 12/18
See application file for complete search history.

(56) References Cited

U.S. PATENT DOCUMENTS

| | | | |
|---|---|---|---|
| 7,502,929 B1* | 3/2009 | Schnizlein | H04L 61/2015 709/202 |
| 7,525,938 B2* | 4/2009 | Hurtta | H04W 28/18 370/328 |
| 7,911,968 B1 | 3/2011 | Foladare et al. | |

(Continued)

OTHER PUBLICATIONS

Schoenen et al, Dynamic Demand Control with Differentiated QoS in User-in-the-Loop Controlled Cellular Networks, IEEE, Jun. 2-5, 2013, 2 Pgs.

Primary Examiner — Alina A Boutah
(74) Attorney, Agent, or Firm — McDermott Will & Emery

(57) ABSTRACT

Methods and systems for managing NAC privileges based on communication context awareness are provided. In one aspect, a method includes detecting, by a network server, a collaboration session between at least first and second users and retrieving, by a network server from a directory server, a first role of the first user that corresponds with privileges including a first quality of service level. Further, the network server retrieves a second role of the second user that corresponds with privileges including a second quality of service level. Also, the method includes determining that the first quality of service level is greater than the second quality of service level and assigning the second user at least the privileges corresponding to the first role. The collaboration session is conducted between the first user and the second user based on the privileges assigned to the second user that correspond to the first role.

19 Claims, 5 Drawing Sheets

(56) References Cited

U.S. PATENT DOCUMENTS

| | | | | |
|---|---|---|---|---|
| 8,553,553 B1* | 10/2013 | Hardie | H04L 41/0803 | 370/229 |
| 8,849,296 B2 | 9/2014 | Song et al. | | |
| 9,380,266 B2* | 6/2016 | Pai | H04N 7/15 | |
| 10,594,478 B2* | 3/2020 | Coon | H04L 63/105 | |
| 2003/0110397 A1* | 6/2003 | Supramaniam | G06F 21/6209 | 726/1 |
| 2004/0068578 A1* | 4/2004 | Corson | H04L 12/185 | 709/238 |
| 2004/0081093 A1* | 4/2004 | Haddock | H04L 47/10 | 370/230 |
| 2005/0038834 A1* | 2/2005 | Souder | G06F 9/5027 | |
| 2005/0187957 A1* | 8/2005 | Kramer | H04L 12/1432 | |
| 2005/0289642 A1* | 12/2005 | Pacholec | G06F 21/31 | 726/4 |
| 2006/0026682 A1* | 2/2006 | Zakas | H04L 29/06 | 726/22 |
| 2007/0195788 A1* | 8/2007 | Vasamsetti | H04W 28/24 | 370/395.21 |
| 2007/0288572 A1* | 12/2007 | Busa | H04L 63/029 | 709/205 |
| 2008/0056135 A1 | 3/2008 | Lee et al. | | |
| 2008/0313716 A1* | 12/2008 | Park | H04L 63/104 | 726/4 |
| 2011/0051731 A1* | 3/2011 | Mang | H04L 47/2458 | 370/395.21 |
| 2011/0158184 A1* | 6/2011 | Agulnik | H04W 28/18 | 370/329 |
| 2012/0089682 A1* | 4/2012 | Wu | H04W 28/24 | 709/206 |
| 2012/0167179 A1* | 6/2012 | Evans | H04M 15/66 | 726/4 |
| 2013/0343222 A1* | 12/2013 | Chen | H04L 41/5038 | 370/252 |
| 2014/0165162 A1* | 6/2014 | Black | H04L 63/10 | 726/4 |
| 2015/0173107 A1* | 6/2015 | Newberg | H04W 76/45 | 455/416 |
| 2015/0189540 A1* | 7/2015 | Jung | H04L 47/805 | 370/230 |
| 2015/0244626 A1* | 8/2015 | Childress | H04L 47/125 | 370/235 |
| 2016/0037550 A1* | 2/2016 | Barabell | H04B 17/318 | 455/450 |
| 2016/0157134 A1* | 6/2016 | Kordianowski | H04W 4/08 | 455/518 |
| 2017/0237790 A1* | 8/2017 | Patel | H04L 65/4061 | 709/203 |
| 2017/0288886 A1* | 10/2017 | Atarius | H04L 12/1407 | |
| 2019/0028375 A1* | 1/2019 | Kandula | G06F 11/0793 | |
| 2019/0387555 A1* | 12/2019 | Wang | H04L 41/5051 | |

\* cited by examiner

SYSTEM AND METHOD FOR MANAGING NETWORK ACCESS CONTROL PRIVILEGES BASED ON COMMUNICATION CONTEXT AWARENESS

BACKGROUND

Many conventional communication networks assign quality of service (QoS) privileges to network users. For example, some communication network service providers assign certain QoS privileges to a network user determined by a service level agreement. Typically, when the network user changes the terms of the service level agreement the communication network service provider will reassign the QoS privileges level assigned to the network user as agreed upon. In some other conventional communication networks, the communication network service provider authorizes, under a service level agreement, certain network users the ability to temporarily reassign the QoS privileges level of another network user without requiring interaction by the service provider.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art will realize, the described implementations may be modified in various different ways, all without departing from the scope of the present disclosure. Accordingly, the drawings and description are to be regarded as illustrative in nature and not restrictive.

General Overview

The disclosed system provides for managing Network Access Control (NAC) privileges based on communication context awareness. For example, prior to or during a collaboration session, an NAC server monitors roles of users or participants and manages privileges of the users, such that users with lower roles are assigned privileges that are associated with a user with a higher role. The collaboration session is conducted between the users based on the privileges corresponding to the user with the highest role, such privileges being assigned to the users with the lower roles to improve communication during the collaboration session.

The disclosed system addresses a technical problem tied to computer technology and arising in the realm of computer networks, namely the technical problem of conducting a collaboration session over a network, between multiple users with differing network access privileges. It may not be preferred to conduct the collaboration session at a privilege level corresponding to a user with a lowest role relative the other users. As an example, video quality during conventional collaboration sessions is typically conducted at the privilege level corresponding to the lowest role attributed to a user participating in the collaboration session. The disclosed system solves this technical problem by optimizing network access during a collaboration session. For example, the disclosed system assigns at least the privileges corresponding to the user with the highest role to the users with roles that are lower than the user with the highest role to improve communication during the collaboration session.

Example System Architecture

Figure 1:
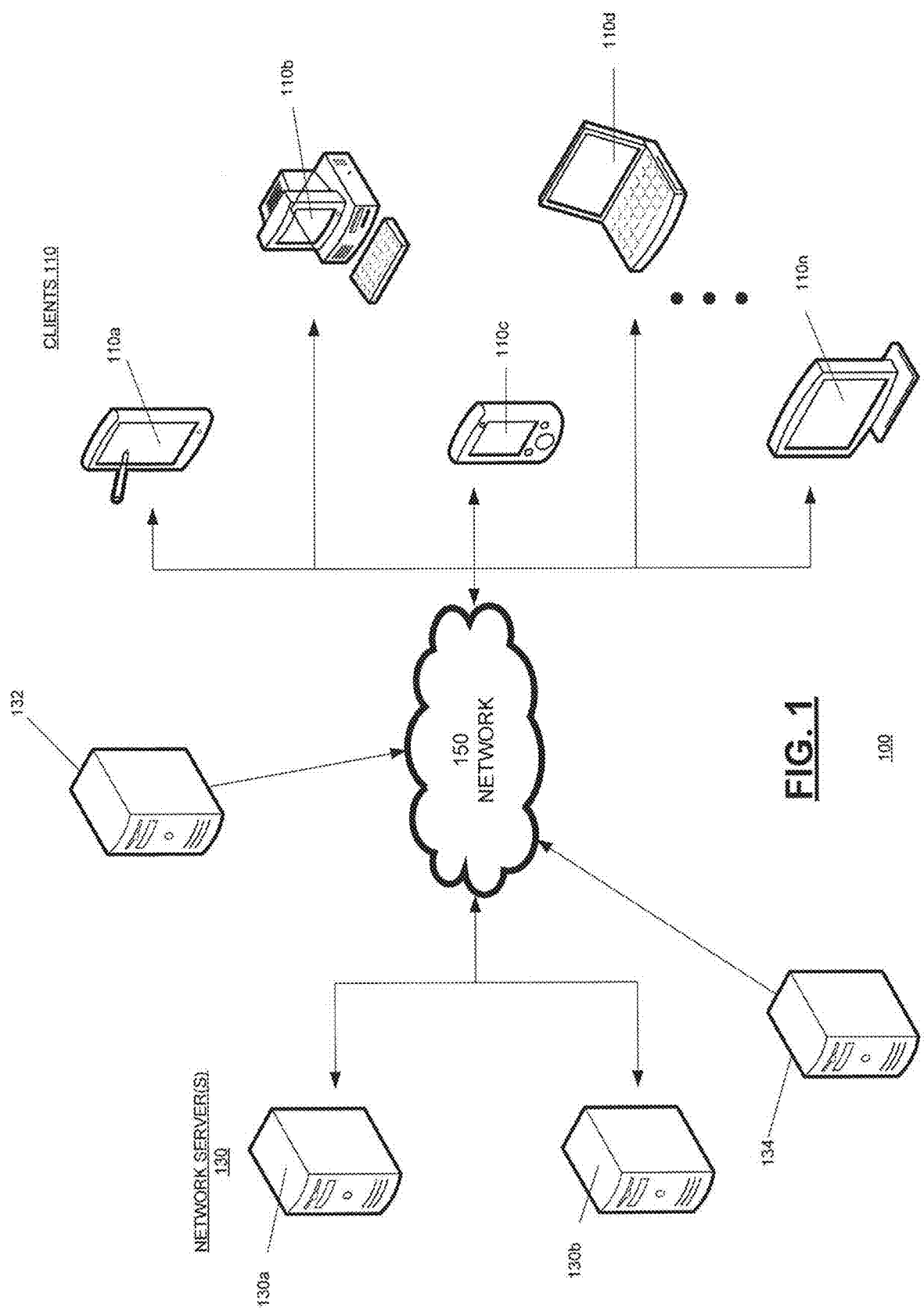
FIG. 1 illustrates an example architecture wherein Network Access Control (NAC) privileges are managed based on communication context awareness.

FIG. 1 illustrates an example architecture 100 for wherein NAC privileges are managed based on communication context awareness. The architecture 100 includes one or more client 110, one or more network server 130, at least one directory server 132, and at least one computing resource 134 connected over a network 150.

The network server(s) 130 (e.g., network servers 130a, 130b) are configured to host a NAC management application that manages NAC privileges for client(s) 110 prior to or during a collaboration session over a network based on communication context awareness. For purposes of load balancing, a plurality of servers 130 may host the NAC management application. The network server(s) 130 may be any device comprising an appropriate processor, memory, and communications capability for hosting the NAC management application, such as, but not limited to, a centralized network server (e.g., a centralized NAC server) capable of implementing NAC management and security enforcement.

The NAC management application on the network server(s) 130 detects upcoming or in-progress collaboration sessions between the clients 110. The NAC management application on the network server(s) 130 also retrieves roles 230 (see FIG. 2) associated with current users of each of the corresponding client(s) 110. The role associated with each user corresponds with privileges including quality of service (QoS) level. The QoS level corresponding to the role associated with each user determines the minimum guaranteed QoS level for the user's network communication sessions. The NAC management application on the network server(s) 130 may compare the QoS level of each client and determine the highest QoS level present during the detected collaboration session. Responsive to determining the highest QoS level among clients 110 in the detected collaboration session, the NAC management application on the network server(s) 130 assigns to the other users at least privileges, including the QoS level, corresponding to the role associated with the highest QoS level.

The directory server 132 is configured to host the roles 230 of the users and/or the privileges, including the QoS level, corresponding to each role. The directory server 132 is configured to, responsive to a request from the NAC management application on the network server 130, transmit to the network server 130 the QoS level corresponding to the role that is the subject of the request. In some aspects, the directory server 132 is configured to store the roles 230 of the users including, but not limited to, clients 110 and/or privileges associated with the user, verify credentials, define access rights, etc.

The computing resource 134 is configured to host user information, such as, but not limited to, calendar schedules, communication schedules, frequency of events, location of events, pattern of events, and other scheduling information. The computing resource 134 is configured to, responsive to requests from the NAC management application on the network server 130, transmit such information, for example, to the network server 130. In some aspects, the computing resource 134 can be, for example, a calendar application, a call manager, a collaboration server, a location service application, a user and entity behavior analytics (UEBA) server, and a span port application such as a networking switch.

The client(s) 110, including clients 110a, 110b, . . . 110n, to which the network servers 130 are connected over the network 150 may be, for example, desktop computers, mobile computers, tablet computers (e.g., including e-book readers), mobile devices (e.g., a smartphone or PDA), set top boxes (e.g., for a television), and/or other devices having appropriate embedded processor, memory, and communications capabilities. In certain aspects, one or more of the network server(s) 130 may be a cloud computing server associated with infrastructure-as-a-service (IaaS) and capable of supporting platform-as-a-service (PaaS) and software-as-a-service (SaaS) functionalities. An individual user may be associated with a particular client device of the client(s) 110. Further, a user may login to any device of the client(s) 110, and the role associated with that user is thereby imparted to the client 110 onto which the user has logged in.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network may be wired or wireless, as mentioned hereinbelow.

Figure 2:
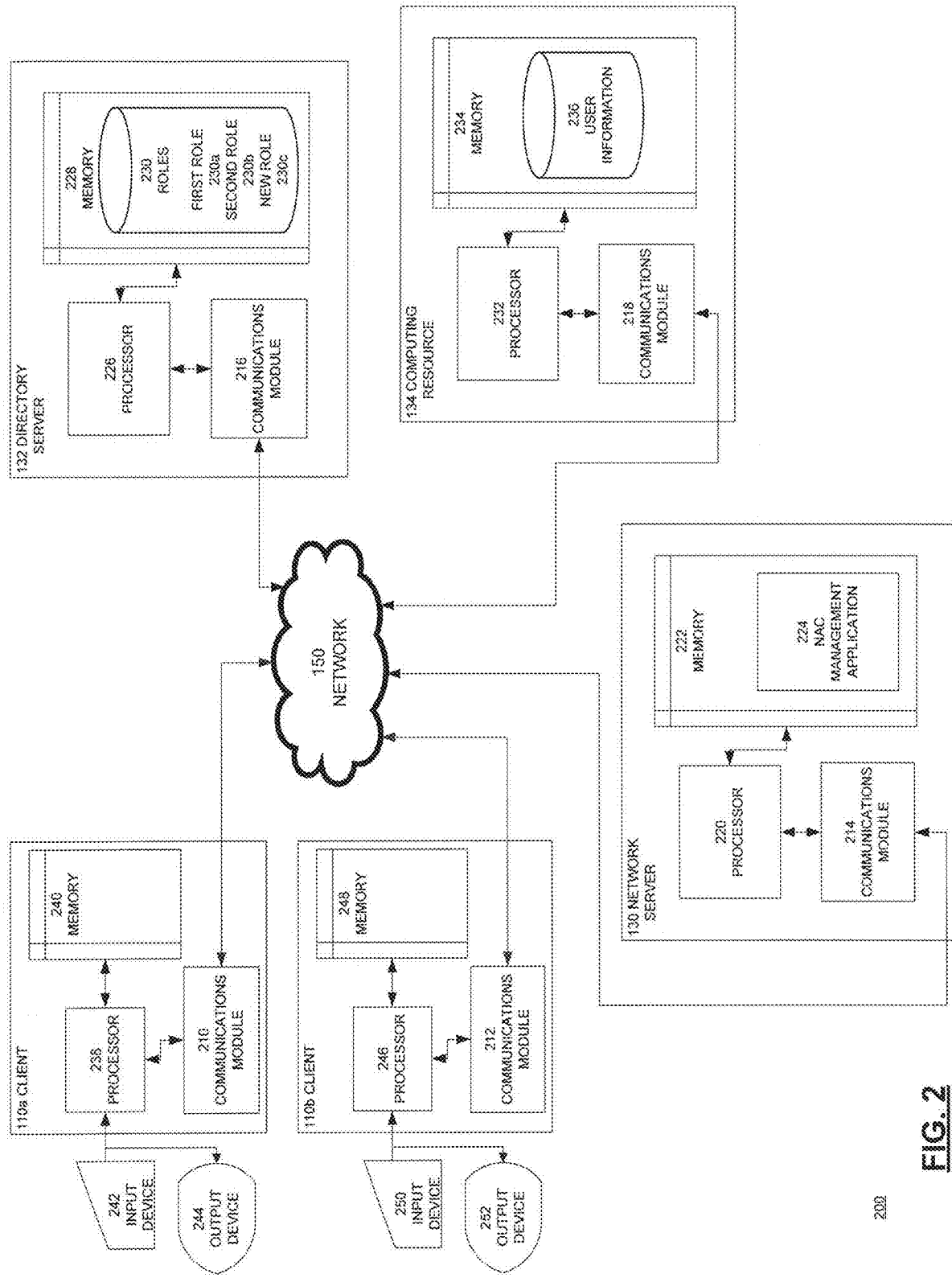
FIG. 2 is a block diagram illustrating example clients, network server, directory server, and computing resource from the architecture of FIG. 1 according to certain aspects of the disclosure.

Example System For Managing NAC Privileges
Based on Communication Context Awareness FIG. 2 is a block diagram illustrating a system 200 comprising the client(s) 110, the one or more network server(s) 130, the at least one directory server 132, and the at least one computing resource 134 shown in the architecture 100 of FIG. 1 according to certain aspects of the disclosure.

In this example embodiment, the client(s) 110 further comprise first and second clients 110a, 110b. The first and second clients 110a, 110b, the at least one network server 130, the directory server 132, and the computing resource 134 are connected over the network 150 via respective communications modules 210, 212, 214, 216, 218. The communications modules 210, 212, 214, 216, 218 are configured to interface with the network 150 to transmit and receive information, such as data, requests, responses, and commands to other devices on the network. The communications modules 210, 212, 214, 216, 218 may be, for example, modems, Ethernet cards, and/or other suitable communications hardware/software.

Figure 3:
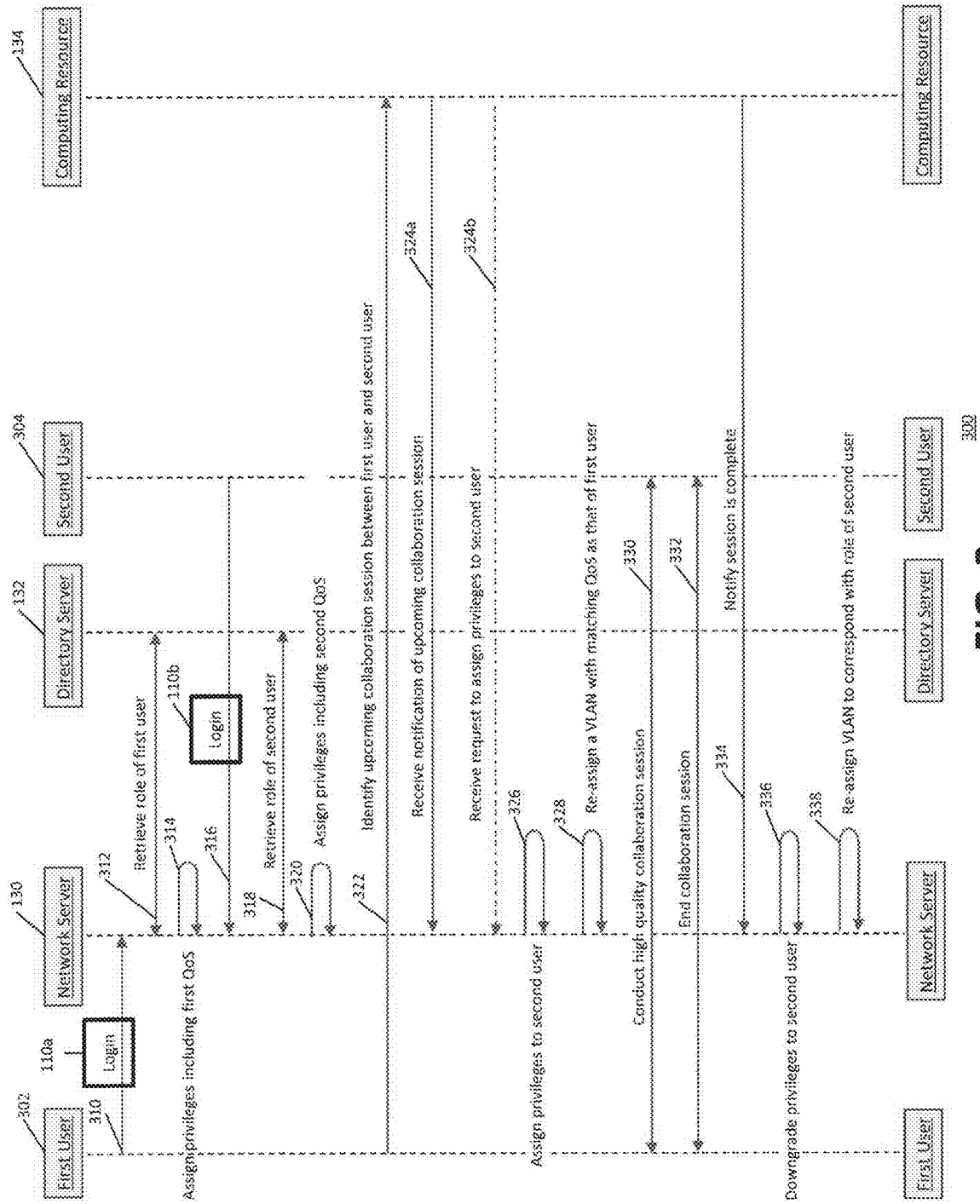
FIG. 3 illustrates an example process for managing NAC privileges based on communication context awareness using the example clients and servers of FIG. 2.

The network server 130 includes a processor 220, the communications module 214, and a memory 222 that includes a NAC management application 224. The processor 220 of the network server 130 is configured to execute instructions, such as instructions physically coded into the processor 220, instructions received from software in memory 222, instructions delivered from a remote memory, or a combination thereof. For example, the processor 220 of the network server 130 may execute instructions from the NAC management application 224 to detect a collaboration session between at least a first user associated with the client 110a and a second user associated with the client 110b. According to this example, the at least one network server 130 further retrieves, from the directory server 132, a first role 230a (FIG. 2) of the first user 302 (FIG. 3) and a second role 230b (FIG. 2) of the second user 304 (FIG. 3). The first role 230a corresponds with privileges including a first QoS level, and the second role 230b corresponds with privileges including a second QoS level. The processor 220 of the network server 130 also executes instructions from the NAC management application 224 to determine whether the first or second QoS level is higher. Although only two users are illustrated in the above example, the collaboration session may include any number of users and each user may be associated with any number of clients. Where there are more than two users and/or clients that are involved in a collaboration session, the processor 220 of the network server 130 may execute instructions from the NAC management application 224 to determine the highest QoS level associated with the users involved in the collaboration session.

In accordance with an example operational scenario, the processor 220 of the network server 130 determines that the first QoS level is greater than the second QoS level. The processor 220 of the network server 130 also executes instructions from the NAC management application 224 to assign, based on such a determination, the second user at least the privileges corresponding to the first role 230a. The network access privileges assigned to the second user include the first QoS level in this example scenario. After determining that the first user has left the collaboration session or that the collaboration session has ended, the processor 220 of the network server 130 may execute instructions from the NAC management application 224 to downgrade the assigned privileges of the second user. When the assigned network privileges of the second user are downgraded, the network privileges of the second user may be returned to those privileges corresponding to the second role 230b. According to another example, the network privileges of the second user may be downgraded to some other suitable QoS level, even if different from the QoS level initially associated with the second user. In an example where initially three or more users and/or clients were participating in a collaboration session, upon the first user associated with the highest QoS level leaving the collaboration session, the second user may be assigned a new QoS level that corresponds to the highest QoS level associated with the remaining users involved in the collaboration session after the first user left.

The directory server 132 includes a processor 226, the communications module 216, and a memory 228 having stored thereon the roles 230. The processor 226 of the directory server 132 is configured to execute instructions, such as instructions physically coded into the processor 226, instructions received from software in memory 228, instructions delivered from a remote memory, or a combination thereof. For example, the processor 226 of the directory server is configured to, responsive to a request from the NAC management application 224 on the network server 130, transmit to the network server 130 the QoS level corresponding to the role(s) 230 that are the subject of the request. The memory 228 stores the roles 230 of each user in the memory 228. The present disclosure contemplates that the roles 230 associated with each user may include data related to job title, guest/employee designation, hierarchy identification, emergency overrides, group affiliations, administrator designations, and/or other suitable or relevant user data. The roles 230 of each user may further include privileges, such as QoS level, based on a piece of user data.

The computing resource 134 includes a processor 232, the communications module 218, and a memory 234 having stored thereon user information 236. The processor 232 of the computing resource 134 is configured to execute instructions, such as instructions physically coded into the processor 232, instructions received from software in memory 234, instructions delivered from a remote memory, or a combination thereof. For example, the processor 232 of the computing resource 134 is configured to, responsive to requests from the NAC management application 224 on the network server 130, transmit portions of the user information 236 stored in the memory 234, such as, but not limited to, calendar schedules, communication schedules, frequency of events, location of events, pattern of events, and other scheduling information.

As discussed above, the computing resource 134 may be a calendar application, a call manager, a location service application, a collaboration server, a user and entity behavior analytics (UEBA) server, a span port application such as a Level-3 switch, and/or another suitable source of user information. In some aspects, the request from the NAC management application 224 on the network server 130 may be a polling request directed to specific user information stored in the user information 236 and associated with a particular user. The request from the NAC management application 223 on the network server 130 may be a subscribing request such that the computing resource 134, after an initial request, continuously provides the network server 130 with updated user information from the user information 236 stored in the memory 234 associated with the computing resource. The present disclosure contemplates that the computing resource 134 may be a software application, perhaps with information stored across distributed memory and/or cloud storage, and/or a hardware component.

In some aspects where the computing resource 134 is an UEBA server, the processor 232 of the computing resource 134 is configured to monitor communication patterns and determine or predict repeated patterns of ad hoc collaboration sessions between users having different roles with correspondingly different privileges. The processor 232 of the computing resource 134 is also configured to transmit a request to the network server 130 to assign to a user associated with a lower role at least the privileges corresponding to a higher role including a higher QoS level. The processor 232 of the computing resource 134 is configured to recommend that such a request be made permanently or temporarily.

The first client 110a includes a processor 238, the communications module 210, and a memory 240. The client 110a also comprises an input device 242, such as a keyboard, mouse, and/or another suitable input device, and an output device 244, such as a display, port, transducer, and/or another suitable output device. The processor 238 of the client 110a is configured to execute instructions, such as instructions physically coded into the processor 238, instructions received from software in memory 240, instructions delivered from a remote memory, or a combination thereof. For example, the processor 238 of the client 110a executes instructions to transmit data, including login data entered on the input device 242 by, for example, a first user, to the network server 130. Login data and/or other user credentials may be used to establish the roles 230 and/or the user information 236.

The second client 110b includes a processor 246, the communications module 212, and a memory 248. The second client 110b may also comprise an input device 250, such as a keyboard, mouse, and/or another suitable input device, and an output device 252, such as a display, port, transducer, and/or another suitable output device. The processor 246 of the second client 110b is configured to execute instructions, such as instructions physically coded into the processor 246, instructions received from software in memory 248, instructions delivered from a remote memory, or a combination thereof. For example, the processor 246 of the client 110b executes instructions to transmit data, including login data entered on the input device 250 by, for example, a second user, to the network server 130.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

FIG. 3 illustrates an example process 300 for proactively managing NAC privileges for users associated with the clients 110a, 110b prior to a collaboration session over the network 150 based on communication context awareness using the example network server 130, the directory server 132, and the computing resource 134 of FIG. 2. In the example process 300, the computing resource 134 may be a calendar application, an UEBA server, and/or another computing resource. While FIG. 3 is described with reference to the system 200 of FIG. 2, it should be noted that the process steps of FIG. 3 may be performed by other systems having more or fewer components as compared with the system 200 of FIG. 2.

The process 300 begins by proceeding to step 310 when the network server 130 receives a first login credential of a first user 302 entered onto the first client 110a. At step 312, the network server 130 retrieves, from the directory server 132, the first role 230a of the first user 302. Responsive to receiving the first role 230a of the first user 302, the network server 130 determines that the first role 230a corresponds to privileges including a first QoS level (e.g., a highest QoS level) and assigns the privileges with the first QoS level to the first user 302, as illustrated at step 314. At step 316, the network server 130 receives a second login credential of a second user 304 entered onto the second client 110b. At step 318, the network server 130 retrieves, from the directory server 132, the second role 230b of the second user 304. Responsive to receiving the second role 230b of the second user 304, the network server 130 determines that the second role 230b corresponds to privileges including a second QoS level (e.g., a lower QoS level) that is relatively lower than the first role 230a and assigns the privileges of the second QoS level to the second user 304, as illustrated at step 320.

The process 300 illustrates proactively managing NAC privileges for users associated with the one or more clients 110 prior to a collaboration session over the network 150, the computing resource 134 identifies or detects, from the first user 302 via the client 110a (e.g., the first user 302 is determined to be physically co-located with the client 110a), for example, an upcoming collaboration session between the first user 302 and the second user 304, as illustrated at step 322. In some aspects where the computing resource 134 is the calendar application, at step 324a, the network server 130 polls or subscribes to the computing resource 134 to receive upcoming scheduled collaboration sessions between the first user 302 and the second user 304 and receives a notification, transmitted by the computing resource 134, identifying the upcoming scheduled collaboration sessions. In some other aspects wherein the computing resource 134 is an UEBA server, the computing resource 134 may proactively monitor and track communication patterns of the first user 302 and the second user 304. Then, based on identified user behavior trends, the computing resource 134 may request that the network server 130 assign, temporarily and/or permanently, the NAC privileges to the second user 304 and, at step 324b, the network server 130 receives the request from the computing resource 134. Further, the computing resource 134 may recognize a repeated pattern of ad hoc collaboration sessions between the first user 302 and the second user 304 (e.g., users with different privileges from the first user 302), and, in response thereto, transmit a request to the network server 130 to assign to the second user 304 at least the privileges corresponding to the first role 230a of the first user 302 including the first QoS level. The request from the UEBA to the network server 130 may permanently assign the second user 304 at least the privileges corresponding to the first role 230a, including the first QoS level, whenever there is a collaboration session between the first user 302 and the second user 304 or may temporarily assign the second user 304 at least the privileges corresponding to the first role 230a including the first QoS level for that particular collaboration session.

Responsive to either receiving the notification or the request from the computing resource 134, at step 326, the network server 130 assigns to the second role 230b of the second user 304 at least the privileges corresponding to the first role 230a including the first QoS level and, at step 328, assigns a VLAN corresponding to the first QoS level to the second user 304. At step 330, a high quality collaboration is conducted between the first user 302 and the second user 304 based on the privileges assigned to the second user 304 that correspond to the first role. Step 332 illustrates the end of the collaboration session between the first user 302 and the second user 304. In some aspects, at step 334, the computing resource 134 notifies the network server 130 that the collaboration session is completed. Responsive to either receiving the notification from the computing resource 134 or determining the collaboration is completed, at step 336, the network server 130 downgrades the assigned privileges (e.g., the privileges corresponding to the first role 230a including the first QoS level) to the second user 304 back to the privileges corresponding to the second role 230b and, at step 338, re-assigns to the second user 304 a VLAN corresponding to the second QoS level of the second user 304.

Figure 4:
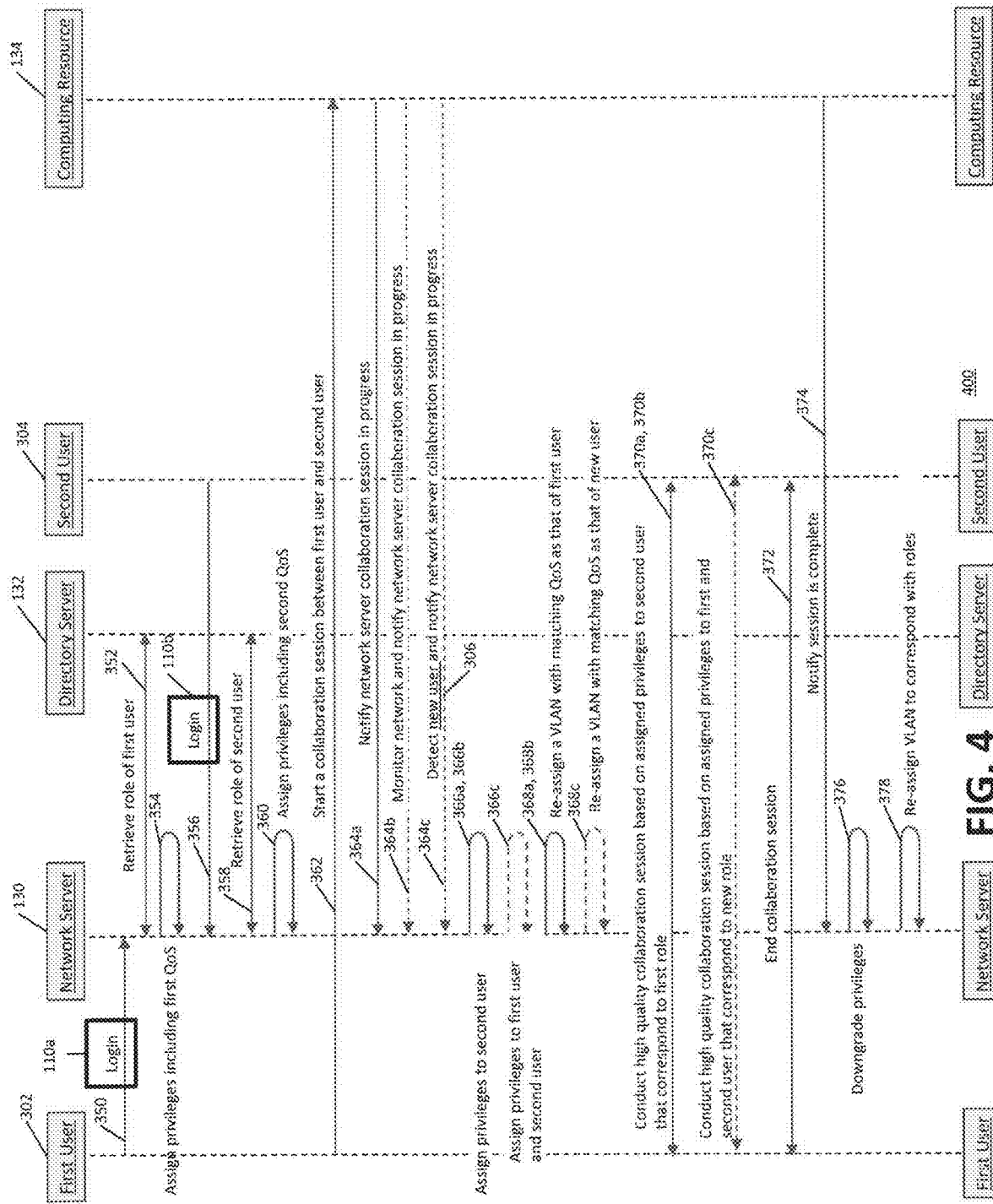
FIG. 4 illustrates another example process for managing NAC privileges based on communication context awareness.

FIG. 4 illustrates another example process 400 for reactively managing NAC privileges for users associated with the one or more clients 110 during a collaboration session over the network 150 based on communication context awareness using the example network server 130, the directory server 132, and the computing resource 134 of FIG. 2. In the example process 400, the computing resource 134 may be a collaboration server, a span port application, a location service application, and/or another suitable computing resource. While FIG. 4 is described with reference to FIG. 2, it should be noted that the process steps of FIG. 4 may be performed by other systems having more or fewer components as compared with the system 200 of FIG. 2.

The process 400 begins by proceeding to step 350 when the network server 130 receives a first login credential of the first user 302 entered through the first client 110a. At step 352, the network server 130 retrieves, from the directory server 132, the first role 230a of the first user 302. Responsive to receiving the first role 230a of the first user 302, the network server 130 determines that the first role 230a corresponds to privileges including a first QoS level (e.g., a relatively high QoS level) and assigns the privileges with the first QoS level to the first user 302, as illustrated at step 354. At step 356, the network server 130 receives a second login credential of the second user 304 entered through the second client 110b. At step 358, the network server 130 retrieves, from the directory server 132, the second role 230b of the second user 304. Responsive to receiving the second role 230b of the second user 304, the network server 130 determines that the second role 230b corresponds to privileges including a second QoS level (e.g., a relatively lower QoS level) that is less than that of the first role 230a and assigns the privileges with the second QoS level to the second user 304, as illustrated at step 360.

As process 400 illustrates reactively managing NAC privileges for users associated with the one or more clients 110 during a collaboration session of the network 150, at step 362, a collaboration session starts between the first user 302 and the second user 304 wherein the first QoS level of the first user 302 is greater than the second QoS level of the second user 304. In some aspects where the computing resource 134 is a collaboration server, at step 364a, the computing resource 134, responsive to the collaboration session starting, transmits a notification to the network server 130 that the collaboration session is in progress between the first user 302 and the second user 304. In some other aspects where the computing resource 134 is a span port application, at step 364b, the network server 130 continuously monitors at least the computing resource 134 and the network 150 and scans for collaboration protocols to detect ongoing collaboration sessions and transmits a notification to the network server 130 when it determines a collaboration session is in progress. For example, the network server 130 may monitor signaling protocols including, but not limited to, signal initiation protocol (SIP), signaling system No. 7 (SS7), and H.323 for retrieving user information. The network server 130 may also monitor session description specification protocols including, but not limited to, session description protocol (SDP) and multimedia transport protocols including, but not limited to, real-time transport protocol (RTP) for detecting collaboration sessions. In some other aspects where the computing resource 134 is a location service application and a calendar application, at step 364c, during an ongoing collaboration session, such as in a meeting room, for example, the computing resource 134 detects a new user 306 entering the room via receiving location updates of another client associated with the new user 306 and identifying the current location of the new user 306 as the meeting room location. Further, according to this step, the new user 306 may have a relatively higher new role 230c (FIG. 2) than the first user 302 and the second user 304 currently participating in the collaboration session. With this location information, the computing resource 134 then searches the meeting room location in the calendar application to identify the ongoing collaboration session and transmit a notification to the network server 130 to assign to the first user 302 and the second user 304 at least the network access privileges, including a higher QoS level, corresponding to the new role 230c of the new user 306.

Responsive to receiving either of the notifications in step 364a or 364b, at steps 366a and 366b, the network server 130 assigns to the second role 230b of the second user 304 at least the privileges corresponding to the first role 230a including the first QoS level. Then, at steps 368a and 368b, the network server 130 assigns a VLAN corresponding to the first QoS level to the second user 304. Responsive to receiving the notification in step 364c, at step 366c, the network server 130 assigns to the first role 230a of the first user 302 and the second role 230b of the second user 304 at least the privileges corresponding to the new role 230c, including the new QoS level. Next, at step 368c, the network server 130 assigns a VLAN corresponding to the new QoS level to the first user 302 and the second user 304.

At steps 370a and 370b, a high quality collaboration is conducted between the first user 302 and the second user 304 based on the privileges assigned to the second user 304 that correspond to the first role 230a. At step 370c, a high quality collaboration is conducted between the first user 302, the second user 304, and the new user 306 based on the privileges assigned to the first user 302 and the second user 304 that correspond to the new role 230c. Step 372 illustrates the end of the collaboration session between the first user 302 and the second user 304 (and, when the computing resource 134 is the location service application and the calendar application, the new user 306). In some aspects, at step 374, the computing resource 134 notifies the network server 130 that the collaboration session is completed. Responsive to either receiving the notification from the computing resource 134 or determining the collaboration is completed, at step 376, the network server 130 downgrades the assigned privileges (e.g., privileges corresponding to the new role 230c including the new QoS level) of the second user 304 back to the privileges corresponding to the second role 230b (and, where the computing resource 134 is the location service application and the calendar application, also downgrades the assigned privileges of the first user 302 back to the privileges corresponding to the first role 230a). Further, at step 378, the network server 120 re-assigns to the second user 304 a VLAN corresponding to the second QoS level of the second user 304 (and, where the computing resource 134 is the location service application and the calendar application, also re-assigns to the first user 302 a VLAN corresponding to the first QoS level of the first user 302).

Hardware Overview

Figure 5:
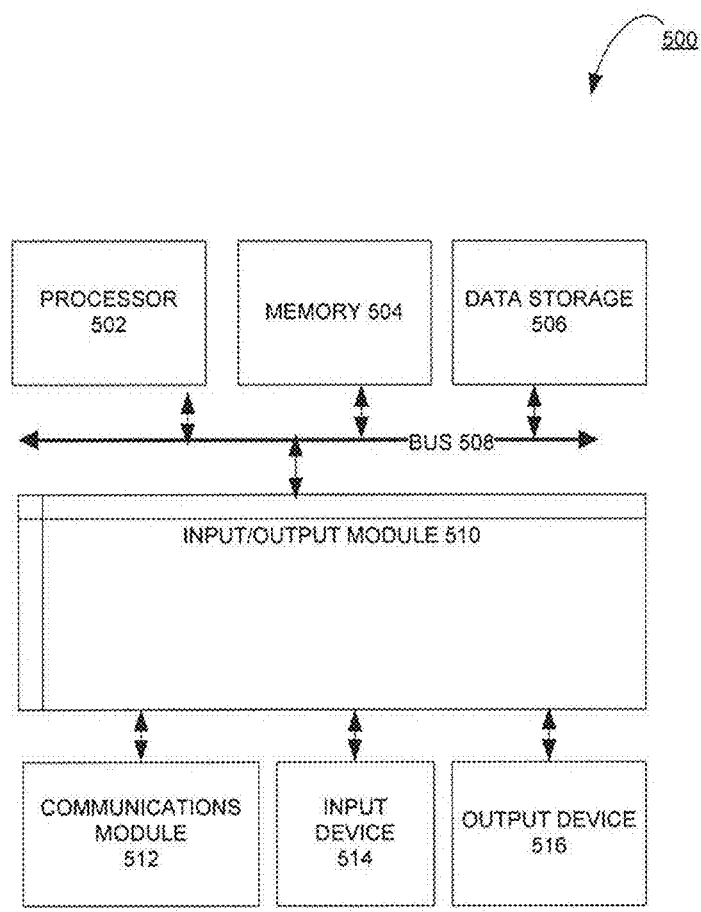
FIG. 5 is a block diagram illustrating an example computer system with which the example client(s), server(s), and/or computing resource(s) of FIG. 2 may be implemented.

FIG. 5 is a block diagram illustrating an example computer system 500 with which the clients 110, the network server 130, the directory server 132, and the computing resource 134 of FIG. 2 can be implemented. In certain aspects, the computer system 500 may be implemented using hardware or a combination of software and hardware, either in a dedicated server, integrated into another computing component, or distributed across multiple computing components.

Computer system 500 (e.g., the clients 110, the network server 130, the directory server 132, and the computing resource 134) may include a bus 508 and/or another suitable communication mechanism for communicating information, and one or more processors 502 (e.g., processors 220, 226, 232, 238, and 246) coupled with the bus 508 for processing information. According to one aspect, the computer system 500 can be a cloud computing server of an IaaS that is able to support PaaS and SaaS services. According to an example embodiment, the computer system 500 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 500 may be implemented with the one or more processors 502. The one or more processors 502 may comprise a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

The computer system 500 may include, in addition to hardware, code that creates an execution environment for the computer program in question, e.g., code that constitutes processor firmware, a protocol stack, a database management system, an operating system, or a combination of one or more of them stored in an included memory 504 (e.g., memory 222, 228, 234, 240, and 248), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 508 for storing information and instructions to be executed by the one or more processors 502. The processor(s) 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may further include secure information. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 504 may also be used for storing temporary variables or other intermediate information during execution of instructions to be executed by the processor(s) 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 408 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with the processor(s) 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. The communications modules 512 (e.g., 210, 212, 214, 216, and 218) may comprise networking interface cards, such as Ethernet cards and/or modems.

The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link and communications module 512. In the Internet example, a server might transmit a requested code for an application program through the Internet, the ISP, the local network, and the communications module 512. The received code may be executed by the processor(s) 502 as it is received, and/or stored in the data storage device 506 for later execution.

In certain aspects, the input/output module 510 is configured to connect to a plurality of devices, such as an input device 514 (e.g., input device 242 and 250) and/or an output device 516 (e.g., output device 244 and 252). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the clients 110, the network server 130, the directory server 132, and the computing resource 134 can be implemented using the computer system 500 in response to the processor(s) 502 executing one or more sequences of one or more instructions contained in the memory 504. Such instructions may be read into the memory 504 from another machine-readable medium, such as the data storage device 506. Execution of the sequences of instructions contained in the memory 504 causes the processor(s) 502 to perform the process steps described herein. One or more processors in a multi-processing arrangement may also be employed to execute the sequences of instructions contained in the memory 504. The processor(s) 502 may process the executable instructions and/or data structures by remotely accessing the computer program product, for example by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

As mentioned hereinabove, the computing system 500 may include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 506. Volatile media include dynamic memory, such as the memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

What is claimed is:

1. A method comprising:
   detecting, by a centralized network access control server, a collaboration session between at least a first user and a second user;
   retrieving, by the centralized network server from a directory server, a first role of the first user, the first role corresponding with privileges including a first quality of service level;
   retrieving, by the centralized network access control server from the directory server, a second role of the second user, the second role corresponding with privileges including a second quality of service level;
   determining, by the centralized network access control server, that the first quality of service level is greater than the second quality of service level;
   assigning, by the centralized network access control server, the second user at least the privileges corresponding to the first role including the first quality of service level; and
   conducting the collaboration session between the first user and the second user based on the privileges assigned to the second user that correspond to the first role.

2. The method of claim 1, wherein the directory server stores roles associated with at least the first and the second users, the roles determined by one of a job title, a guest/employee designation, and a hierarchy identification.

3. The method of claim 1, wherein detecting, by the centralized network access control server, the collaboration session is based on a prediction from a user behavioral analysis.

4. The method of claim 1, wherein assigning, by the centralized network access control server, the second user at least the privileges corresponding to the first role occurs before detecting, by the network server, the collaboration session.

5. The method of claim 1, wherein detecting, by the centralized network access control server, the collaboration session comprises:
   determining that the first user is physically co-located with a client connected to the collaboration session.

6. The method claim 1, further comprising monitoring, by the centralized network access control server, a computing resource for ongoing collaboration sessions.

7. The method claim 6, wherein monitoring, by the centralized network access control server, the computing resource for the ongoing collaboration sessions comprises monitoring signaling protocols including at least one of session description protocol (SIP), signaling system No. 7 (SS7), and H.323 for retrieving user information and monitoring at least one of session description protocol (SDP) and real-time transport protocol (RTP) for detecting the ongoing collaboration sessions.

8. The method of claim 1, wherein detecting, by the centralized network access control server, the collaboration session between at least the first user and the second user comprises:
   receiving, by the network from a computing resource, a notification of the collaboration session.

9. The method of claim 8, wherein the computing resource is one of a calendar, a call manager, a location service, a level-3 switch, and a user and entity behavior analytics (UEBA) server.

10. The method of claim 1, further comprising downgrading, by the centralized network access control server, the privileges assigned to the second user from the privileges corresponding to the first role back to the privileges corresponding to the second role based on the first user leaving the collaboration session.

11. A system comprising:
    a memory comprising instructions; and
    one or more processors configured to execute the instructions to:
       detect a collaboration session between at least a first user and a second user;
       retrieve a first role of the first user, the first role corresponding with first privileges including a first quality of service level;
       retrieve a second role of the second user, the second role corresponding with second privileges including a second quality of service level;
       determine that the first quality of service level is greater than the second quality of service level;
       assign the second user to a network corresponding to the first quality of service level; and
       conduct the collaboration session between the first user and the second user based on the first privileges assigned to the second user that correspond to the first role.

12. The system of claim 11, wherein the instructions to assign the second user at least the first privileges corresponding to the first role including the first quality of service level comprise:
    prompting the second user to accept assignment of at least the first privileges corresponding to the first role including the first quality of service level.

13. The system of claim 11, wherein the instructions to detect the collaboration session comprise:
    determine that the first user is physically co-located with a client connected to the collaboration session.

14. The system of claim 11, wherein the one or more processors is also configured to execute the instructions to:
    monitor a computing resource for ongoing collaboration sessions.

15. The system of claim 14, wherein the instructions to monitor a computing resource for ongoing collaboration sessions comprise:
    monitoring signaling protocols including at least one of session description protocol (SIP), signaling system No. 7 (SS7), and H.323 for retrieving user information and monitoring at least one of session description protocol (SDP) and real-time transport protocol (RTP) for detecting the ongoing collaboration sessions.

16. The system of claim 11, wherein the instructions to detect the collaboration session comprise:
    receive, from a computing resource, a notification of the collaboration session.

17. The system of claim 16, wherein the computing resource is one of a calendar, a call manager, a location service, a level-3 switch, and a user and entity behavior analytics (UEBA) server.

18. The system of claim 11, wherein the one or more processors is also configured to execute the instructions to:
    downgrade the first privileges assigned to the second user corresponding to the first role back to the second privileges corresponding to the second role based on the first user leaving the collaboration session.

19. A non-transitory machine-readable storage medium comprising machine-readable instructions for causing a processor to execute a method, the method comprising:
    detecting, by a centralized network access control server, a collaboration session between at least a first user and a second user;
    retrieving, by the centralized network access control server from a directory server, a first role of the first user, the first role associated with a first quality of service level;
    retrieving, by the centralized network access control server from the directory server, a second role of the second user, the second role associated with a second quality of service level;
    determining, by the centralized network access control server, that the first quality of service level is greater than the second quality of service level;
    assigning, by the centralized network access control server, the second user at least the first quality of service level associated with the first role; and
    conducting the collaboration session between the first user and the second user based on the first quality of service level assigned to the second user that corresponds to the first role.

* * * * *